(12) United States Patent
Levinson (10) Patent No.: US 6,231,909 B1
(45) Date of Patent: May 15, 2001

(54) FAT-HOMOGENIZER, BEVERAGE-FROTHER, KITCHEN APPLIANCE TO PREPARE COFFEE, TEA, MILK, EGG, SOY, AND RICE FOODSTUFF

(76) Inventor: Melvin L. Levinson, 8 Stratford Cir., Edison, NJ (US) 08820-1850

( * ) Notice: Subject to any disclaimer, the term of this patent is extended or adjusted under 35 U.S.C. 154(b) by 0 days.

(21) Appl. No.: 09/330,443

(22) Filed: Jun. 11, 1999

Related U.S. Application Data (63) Continuation-in-part of application No. 09/141,886, filed on Aug. 28, 1998, now abandoned.
(60) Provisional application No. 60/073,694, filed on Feb. 4, 1998.

(51) Int. Cl.[7] .............................. A23L 1/025; A23L 1/32; A23L 2/00; A23F 3/00; A23F 5/00
(52) U.S. Cl. .................... 426/433; 426/431; 426/432; 426/435; 426/234; 426/241; 426/580; 426/585; 426/590; 426/594; 426/597; 426/598; 426/519
(58) Field of Search ..................... 426/433, 435, 426/241, 234, 594, 598, 590, 466, 580, 585, 519, 431, 597, 432

(56) References Cited

U.S. PATENT DOCUMENTS

| | | | |
|---|---|---|---|
| 5,591,475 | * | 1/1997 | Ishida . |
| 5,800,852 | * | 9/1998 | Levinson . |
| 5,939,122 | * | 8/1999 | Brady . |

OTHER PUBLICATIONS

Kenneth Davis , Home Coffee Roasting, 1996, pp. 30–32, St. Martin's Press, NYC, NY.
Indiana Soybean Board, Soyfoods Cookbook, Roasted Soy Nuts, 2000, www.soyfoods.com.

* cited by examiner

Primary Examiner—Anthony J. Weier

(57) ABSTRACT

A microwave-oven, hand-operated kitchen appliance to prepare coffee, tea, soy, rice, and egg beverages, froths and desserts, methods for its use and products therefrom. The kitchen appliance homogenizes saturated and unsaturated fat into skim milk, milk, cream, soy, rice and egg to produce enriched beverages, froths and desserts. Microwave-roasting of green coffee beans, soy beans, rice grains and similar beans and grains provides microwave-roasted snacks and beverages. Beverages, froths and desserts are prepared frozen, chilled or heated with and without a foam topping both alcoholic and non-alcoholic. Semi-permanent, nylon-mesh filters replace disposable paper beverage filters.

17 Claims, 3 Drawing Sheets

FAT-HOMOGENIZER, BEVERAGE-FROTHER, KITCHEN APPLIANCE TO PREPARE COFFEE, TEA, MILK, EGG, SOY, AND RICE FOODSTUFF

CROSS REFERENCE TO RELATED US APPLICATIONS

This application is a continuation-in-part of application Ser. No. 09/141,886, filed Aug. 28, 1998 now abandoned and provisional application Ser. No. 60/073,694, filed Feb. 4, 1998.

BACKGROUND OF THE INVENTION

1. Field of the Invention

A hand-operated, small kitchen appliance to prepare coffee, tea, soy, rice, milk and/or egg beverages, froths and desserts. The kitchen appliance homogenizes saturated and unsaturated fat into skim milk, milk, cream, soy, rice, egg and similar foodstuff. The kitchen appliance is used to microwave-roast green coffee beans, soy beans, rice grains and similar beans and grains to provide microwave-roasted snacks, beverages, froths and desserts. Both alcoholic and nonalcoholic beverages and desserts, with and without foam toppings, are described frozen, chilled or heated. Semi-permanent, nylon-mesh filters replace disposable paper filters.

2. Discussion of the Prior Art

Hand operated French Press coffee makers are well known. Hand operated milk frothing apparatus are well known, for example the apparatus taught in U.S. Pat. Nos. 5,580,169 and 5,780,087.

My U.S. Pat. No. 5,635,233, "Methods for Preparing a Coffee, Tea or Milk Beverage," teaches separating the plunger-strainer of the French Press coffee maker into a plunger member and a contiguous filter member.

My U.S. Pat. No. 5,800,852, "A Coffee/Tea, Table Blender and Microwave Oven Apparatus and Methods for Its Use," teaches to combine the utility of a conventional blender and a microwave oven. U.S. Pat. No. 5,800,852, teaches to blend and brew, in the jar of a table blender, coffee, tea or herbal tea immersed in a liquid. Then the brewing coffee, tea or herbal tea, in the blender jar, is removed from its motor base. The blender jar containing the still brewing beverage is placed into a microwave oven, exposed to microwave energy and heated. The blender jar, containing the microwave heated, still-brewing beverage, is returned to its motor base and the blender motor is energized to finish brewing the beverage. The finished brew is filtered out of the blender jar through a reusable filter that covers the blender jar. The instant invention is useful to prepare a cappuccino-type froth for use on top of a beverage prepared in my table-blender/microwave-oven coffee, tea and herbal tea apparatus.

My copending U.S. Pat. No. 5,925,394 for "Methods for Denaturing and Whipping into a Foam Certain Denaturable Proteins Found in Milk Products and Egg Products" teaches how to produce long-lasting milk and egg froths and how to increase the fat content of the resulting product. This copending application concerns electric mixers. This copending application teaches that, if desired, alcohol can be used.

My copending U.S. patent application Ser. No. 08/715,396, filed Sep. 13, 1996, for "Methods of Freezing and Defrosting Certain Foodstuffs in a Microwave Oven," teaches how to freeze and dispense frozen froths and desserts.

Prior-art, hand-operated, milk-frothing apparatus, when operated rapidly, repeatedly up and down, permit liquid fat and coffee ground to by-pass and/or block the frother member. Prior art electric table blender, the hand operated beaters and electric mixers can permit a by-pass of liquid fat when blending and mixing the liquid-fat, milk and egg mixtures, taught herein.

It is well known that commercial equipment exists to homogenize fat in milk. Soy milk and rice milk are well known commodities.

SUMMARY OF THE INVENTION

A kitchen appliance is taught that combines a French Press coffee maker, a milk frothing device and a device that can homogenize fat into milk, egg, soy, rice and other liquid products. The kitchen appliance's plunger is designed to filter coffee and tea, to froth milk, cream and egg products and to homogenize saturated and unsaturated fat into skim milk, milk, cream, egg, soy, rice and other liquid products. The kitchen appliance can consist of multiple containers. The kitchen appliance can employ multiple plungers, for example, a dedicated plunger agitator, per se, a dedicated plunger strainer, per se, a dedicated homogenizer plunger, per se, and a dedicated frothing plunger, per se, or one or more plunger-strainer-homogenizer-frothers. In one embodiment, the plunger-strainer is separated into a plunger member and a contiguous filter member as taught in U.S. Pat. No. 5,635,233. Here, the plunger member and contiguous filter can homogenize fat into beverages while they retain their prior utility. More than one nylonmesh Lycra® filter cover and filter covers of different gauge, dimension and elasticity can be part of the kitchen appliance. Both alcoholic and non-alcoholic beverages and desserts can be prepared frozen, chilled or heated, and with and without a foam topping. The beverages, froths and desserts taught are best prepared in a microwave oven but may be prepared on a conventional gas or electric burner. In addition to plain and enriched-with-oil beverages (e.g. coffee, soy milk and rice milk), froths and desserts and the like, filled milk, microwave-roasted rice, microwave-roasted soy and the like beverages, froths and desserts are taught. "Microwaveroasting" of green coffee beans, soy beans and rice is taught. The "microwave roasted coffee beans" are ground and brewed into an "enriched microwave roasted coffee."

It is an object of this invention to provide a kitchen appliance to homogenize saturated (e.g. butter and the like) and unsaturated fat (e.g. vegetable oil and the like) into skim milk, milk, cream, egg, soy, rice and other liquid beverages to increase their fat content.

It is an object of this invention to homogenize butter fat into skim milk, milk, and cream to produce conventional beverages, froths and desserts.

It is an object of this invention to homogenize unsaturated fat into skim milk, milk, cream, egg, soy, rice and other liquid protein beverages to produce filled beverages, froths and desserts.

It is an object of this invention to brew coffee, generate a milk froth, and prepare a cappuccino-type beverage in the same serving container.

It is an object of this invention to employ a semi-permanent nylon-mesh Lycra® filter cover as a replacement for conventional disposable coffee and tea paper filters.

It is an object of this invention to employ a semi-permanent nylon-mesh Lycra® filter cover as a replacement for the stainless steel screen component of a French Press strainer plunger.

It is an object of this invention to provide apparatus to microwave-roast dried soybeans, dried rice and the like to create microwave-roasted snack foods, beverages, froths and desserts.

It is a further object of this invention to provide a kitchen appliance that utilizes and complements the teachings of my U.S. Pat. No. 5,635,233, my U.S. Pat. No. 5,800,852 and my copending U.S. patent application Ser. No. 08/746,809, filed Nov. 18, 1996. For example, the instant invention can be used, as taught in my copending U.S. patent application Ser. No. 08/746,809, filed Nov. 18, 1996, to prepare a milk or egg froth to add on top of a hot beverage. For example, the instant invention can be used to microwave-roast green coffee beans, dried soybeans, dried rice and the like prior to grinding them into grounds and brewing them in my "Table Blender and Microwave Oven Apparatus."

DESCRIPTION OF THE DRAWINGS

The advantages and benefits resulting from this brewing, frothing and homogenizing, hand operated kitchen appliance will become apparent from the following detailed description and by reference to the accompanying drawings in which:

FIG. 6 is a cut away view that illustrates the nylon-mesh Lycra® filter cover attached to one of the containers of the kitchen appliance or to a common coffee cup. FIG. 6 illustrates the nylon-mesh Lycra® filter filtering out spent coffee grounds from a brewing coffee as the brewed coffee passes through it.

FIG. 7 illustrates a tight fitting nylon-mesh Lycra® filter cover.

FIG. 8 illustrates a loosely fitting nylon-mesh Lycra® filter cover.

DEFINITIONS

1. "Filled milk was defined in the Filled Milk Act (PL-513) of 1923 as follows: any milk, cream, or skimmed milk whether or not condensed, evaporated, concentrated, powdered, dried, or desiccated, to which has been added or which has been blended or compounded with any fat or oil other than milkfat, so that the resulting product is an imitation or semblance of milk, cream, or skimmed milk whether or not condensed, evaporated, concentrated, powdered, dried, or desiccated." (Food Fundamentals, 4th Edition, Margaret McWilliams, Macmillan Publishing Company, New York, page 216)

2. In what follows the terms "soy" and "rice" may be used in the same manner as one calls a cup of coffee, "coffee," and a cup of tea, "tea." When soy oil is added to a soy beverage it remains a conventional soy beverage. When other oils are added it may be termed a "filled soy beverage." The kitchen appliance can be used to prepare a true "soy/milk" (i.e. a soy flavored milk beverage) and a true "rice/milk" (i.e. a rice flavored milk beverage) or it can be used to prepare a conventional "soy milk" (i.e. a soy and water beverage) and a conventional "rice milk" (i.e. a rice and water beverage).

3. The term, "other beverages" connotes that many other beans and seeds, in addition to coffee, tea, herbal tea, soy and rice, provide useful results. For example, dried corn, wheat, and chick peas.

4. The finished beverage, froth or foodstuff may be made from dried ground beans, per se, or a commercially milled flour made from the bean. The commercially milled flour may be microwave-roasted. For example, the green coffee bean is microwave-roasted, ground and brewed into a cup of coffee. For example, dried soy beans are microwave-roasted, ground and brewed into a cup of microwave-roasted soy.

5. From *On Food and Cooking,* Harold McGee, Collier Books, Macmillan Publishing Company, New York, 1988, page 14 teaches "Homogenization". . . "involves forcing the milk at high pressure through a very small nozzle onto a hard surface; it breaks the fat globules up into more uniform particles about a quarter of their original size . . . . When broken down to about a micron in diameter, the individual globules are too small to rise alone, and because their surface area has multiplied beyond the covering capacity of their membranes, some of the other dissolved milk proteins fill in, and apparently interfere with globule aggregation.". . . . "Fresh milk is never homogenized as is, because it will go rancid in a matter of minutes. When stripped of some of its protective membrane, the fat is exposed to the activity of fat-splitting enzymes in the milk, and these quickly produce unappetizing quantities of odiferous free fatty acids. The enzymes are inactivated by high temperatures, and accordingly all milk is pasteurized before or simultaneously with homogenization." Note, as taught herein, the oil is preferably added to pasteurized milk, pasteurized egg mixtures and microwave-roasted and boiled soy and rice.

6. The term "microwave-roasted" refers to a microwave-lossy bean or seed immersed in oil (for example, soy oil, Canola oil, olive oil, melted butter, and corn oil) and exposed to microwave energy. In operation, first water is driven out of the bean or seed and then the dried bean or seed is free to rise to a baking-browning temperature. Exposure to microwave energy is terminated at a predetermined bean or seed color. Exposure is terminated well before the mixture can ignite or emit undesirable smoke and odors. "Microwave-roasting" differs from the core heating taught in my U.S. Pat. No. 5,223,291 in that it concerns homogeneous roasting. Not all beans and seeds microwave-roast.

Pop corn pops. Microwave-roasted rice contains a few small, popped, rice kernels. The microwave-roasted rice seeds, per se, can be partaken as an edible, flavorful, roasted snack food. The oil-covered, microwave-roasted/popped rice seeds may be processed as taught herein to produce a flavorful, microwave-roasted, enriched, rice "milk"

DESCRIPTION OF THE PREFERRED EMBODIMENTS

The kitchen appliance, taught herein, combines (a) a French Press plunger type coffee apparatus; (b) the apparatus taught in U.S. Pat. No. 5,635,233, "Methods for Preparing a Coffee, Tea or Milk Beverage" (i.e. where a prior art one piece plunger-filter is separated into a plunger per se, operating a filter per se); (c) a milk-frothing type apparatus similar to that taught in U.S. Pat. No. 5,580,169, "Milk Jug with Froth-Forming Device for Making 'Cappuccino' and the Like;" (d) an apparatus to homogenize saturated and unsaturated fat into skim milk, milk, cream, coffee, soy, rice and egg, and (e) a beverage filter. These five members of the kitchen appliance have independent utility and are useful in various combinations. The preferred filter is a nylonmesh Lycra® filter.

(a) The Kitchen Appliance Employed as a French Press Plunger Type Coffee Apparatus.

Figure 9:
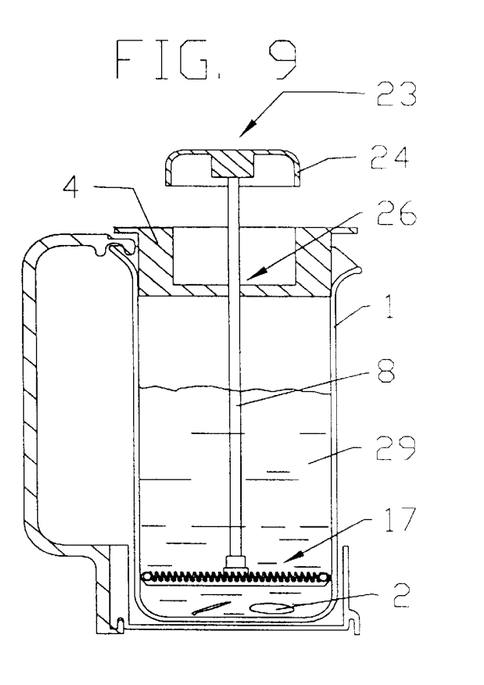
FIG. 9 is a side view, cross-section view of the plunger, frother and/or homogenizing member homogenizing fat into a coffee, tea, soy or rice-beverage in a container.

Presently, there are "microwave oven" plunger type coffee makers, illustrated in FIG. 9, in the marketplace, that teach, before you insert the one piece filter-plunger assembly 23, coffee grounds and water are heated, in glass cylinder container 1, in a microwave oven. Those that sell these prior art, plunger coffee makers teach:

First water is boiled in glass cylinder container 1. Thereafter, a predetermined amount of coffee grounds 2 are added to the boiled water and allowed to brew for a predetermined time, for example, four minutes. Whereupon, filter-plunger apparatus 23 with a permanent stainless steel mesh filter 17 on one end and a lid 4 and a plunger handle 24 on the other end, is inserted into cylinder container 1 and pressed down. Stainless steel mesh filter 17 filters brewed coffee 29 from spent grounds 2 and, thereafter, brewed coffee is poured out of container 1.

The plunger, homogenizer frother 6 (FIG. 1) of the instant invention can be employed as is a conventional plunger-strainer of a French Press coffee apparatus or reciprocated as a homogenizer-frother.

(b) The Kitchen Appliance Employed as the Apparatus Taught in U.S. Pat. No. 5,635,233, "Methods for Preparing a Coffee, Tea or Milk Beverage."

Figure 1:
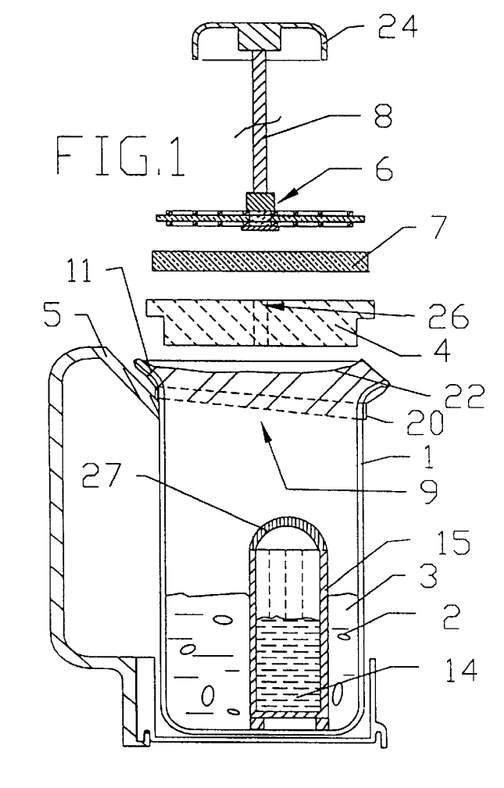
FIG. 1 illustrates a side-view, cross-section, composite view of the kitchen appliance and accessories. On top is illustrated a plunger, frother and/or homogenizing member. Below is a beverage container with a nylon-mesh Lycra® filter cover. Between is an accessory filter member and an accessory cover. In the container is an accessory milk container.

In FIG. 1, plunger, homogenizer frother 6 and beverage filter 7 are illustrated above container 1. Filter 7 is the contiguous, open-pore, polyurethane filter taught in U.S. Pat. No. 5,635,233, "Methods for Preparing a Coffee, Tea or Milk Beverage." In U.S. Pat. No. 5,635,233, the improvement is that the unitary plunger-strainer of the plunger assembly of a French Press coffee maker is separated into a plunger member, per se, operating a separate filter member, per se. In the instant invention, both members may serve as filtering and frothing members.

Figures 2, 5:
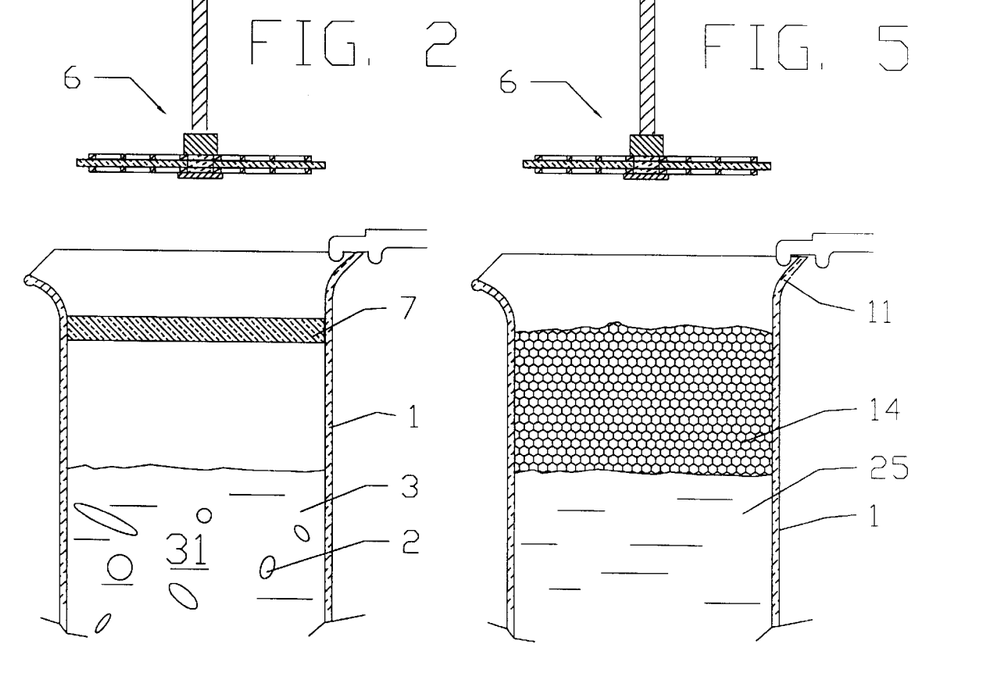
FIG. 2 is a partial, side-view, cross-section view of the plunger, frother and/or homogenizing member and accessory filter member.
FIG. 5 is a partial, side-view, cross-section view of the plunger, frother and/or homogenizing member removed from the resulting homogenized, froth-covered beverage.
Figures 3, 4:
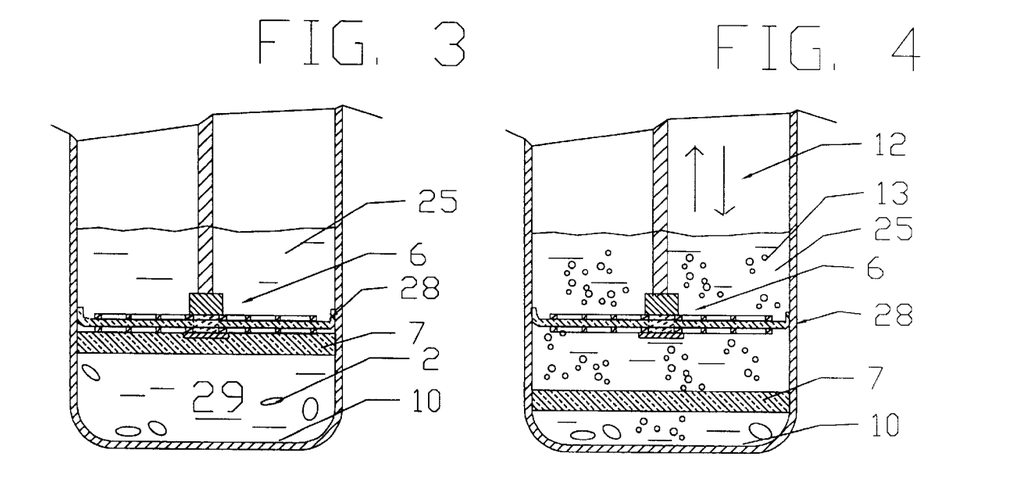
FIG. 3 is a partial, side-view, cross-section view of plunger, frother and/or homogenizing member forcing accessory filter member to the bottom of the coffee-tea-beverage container.
FIG. 4 is a partial, side-view, cross-section view of the plunger, frother and/or homogenizing member disengaged from the accessory filter member after securing it at the bottom of the container. The plunger-frother is rapidly moved up and down to froth a milk or egg, coffee or tea mixture.

In FIGS. 2 and 3, the kitchen appliance is supplied with open-pore, polyurethane filter 7 that coact with novel plunger, homogenizer frother 6 in the same manner as described in U.S. Pat. No. 5,635,233.

(c) The Kitchen Appliance Employed as is the Reciprocating Plunger, Milk-Frothing Type Apparatus Taught in U.S. Pat. No. 5,580,169, "Milk Jug with Froth-Forming Device for Making 'Cappuccino' and the Like."

Plunger, homogenizer frother 6 is fabricated for use in place of the plunger frother assembly and operated in the same manner as is the plunger frother assembly, taught in U.S. Pat. No. 5,580,169, "Milk Jug with Froth-Forming Device for Making 'Cappuccino' and the Like." In FIG. 4, plunger, homogenizer frother 6 is pumped up and down 12 and, in so doing, creates a multitude of small bubbles 13 in frothed liquid 25. In FIG. 5, after the desired amount of froth 14 is generated, plunger, homogenizer frother 6 is removed from container 1.

Optionally, in FIG. 4, when the frothing plunger 6 is employed to froth, frothing plunger 6 may be employed alone or the frothing can be enhanced by using open pore plastic filter 7. Open pore plastic filter 7 may be used after it is employed to trap expended coffee grounds at the bottom of container 1 or open pore plastic filter 7 can be used for the sole purpose of enhancing frothing. In operation, plunger, homogenizer frother 6 is pumped up and down 12 compressing and releasing filter 7 in frothing liquid 25. The compressing and releasing of the open pores of both frother 6 and filter 7 generate a profusion of tiny bubbles 13.

Cylindrical containers of various heights and circumferences are useful. The wider the container the thicker the open pore polyurethane filter 7 must be to enable it to secure itself between the walls of container 1. If the open pores of open pore plastic frother 6 or filter 7 are too small, the hand pressure require to operate plunger 6 can shatter the glass walls of container 1.

By compressing and releasing the open pores of both frother 6 and/or filter 7 in clear water the generation of bubbles can be observed and the thickness and pore size of the individual filter members optimized to suite individual preferences.

(d) The Kitchen Appliance Employed to Homogenize Saturated and Unsaturated Fat in Skim Milk, Milk, Cream, Soy, Rice and Egg Liquids.

*Webster's Unabridged Dictionary of the English Language,* Portland House, NY, 1989, defines homogenize: "2) to break up the fat globules in (milk or cream) in order to distribute them equally throughout." Here, the word "homogenize" includes the breaking up of saturated and non-saturated fat added to milk, cream or egg products in order to distribute the fat equally throughout the product. Here, the word "homogenize" means to process milk, soy, rice or other beverages so that the fat particles are so finely divided and emulsified that a layer of fat does not reform on standing.

*McGraw-Hill Dictionary of Scientific and Technical Terms,* $2^{nd}$ Edition, McGraw-Hill Book Company, NY, 1978, defines a homogenizer as "[MECH ENG.] A machine that blends or emulsifies a substance by forcing it through fine openings against a hard surface." Plunger, homogenizer frother 6 blends or emulsifies liquid fat and milk and egg mixtures by forcing them to pass through the fine openings of plunger, homogenizer frother 6.

To force liquid fat and milk and egg mixtures through the fine openings of an open-pore polyurethane foam, stainless steel mesh or nylon mesh plunger, homogenizer, frother 6, plunger, homogenizer frother 6, must have a larger circumference than the top opening of container 1. In operation, the illustrated, polyurethane-foam, stainless steel mesh or nylon mesh homogenizer, frother, plunger 6, bends and compresses 28 against the walls of container 1. Because the plunger, homogenizer, frother member is elastic and compressible, it rides easily up and down the walls of container 1.

A knowledge of the relative hardness of materials is assumed. The walls of container 1 are harder than the material chosen for plunger, homogenizer, frother 6 so that when it is operated rapidly, repeatedly up and down, it will not abrade the walls of container 1. It is preferred to fabricate container 1 from a conventional transparent, heat-resistant material so that the progress of the frothing and heating operation may be visually monitored and the heating operation terminated before the heat processed liquid can boil out of container 1.

Plunger, homogenizer frother 6 will not emulsify liquid fat in plain water. It is believed that during homogenization a chemical reaction between the liquid fat and a component in the coffee, tea, herbal tea, soy, rice, milk, and egg takes place. Using too much liquid fat and not enough of said component (for example, attempting to homogenize a volume of liquid fat equal to the same volume of coffee, tea, herbal tea, soy, rice, milk, egg or other beverage) results in incomplete homogenization.

The initial fat present has a bearing on how much more fat the particular beverage will accept. For example, egg white and skim milk mixtures have no fat, milk has 1 to 4% saturated fat, etc. Some experimentation is required to determine the maximum amount of liquid fat one can add to a selected product before free fat appears on the surface of that particular product. A good place to start is to add one fourth measure, by volume, liquid fat to a three fourth measure of milk. Then, after tasting the resultant homogenized mixture, add more or less liquid fat to achieve a desired result. If the milk will not accept any more liquid fat, to add more fat add more of said component, for example, add nonfat dry milk to the milk.

My copending U.S. Pat. No. 5,925,394, teaches methods for producing novel expanded foams, beverages and desserts and increasing the fat content of the expanded foam. It concerns conventional, household, electric mixers. In contrast, the novel kitchen appliance taught herein is hand operated. The hand operated kitchen appliance taught herein can homogenize saturated and unsaturated fat into egg and milk products as follows:

(1) Hand operated at slow speed, the kitchen appliance can be employed to increase the fat content of a milk to produce both conventional and/or filled half and half, light cream and heavy cream.

(2) Hand operated at frothing speed, the kitchen appliance can be employed to increase the fat content of a milk froth to produce both a conventional and/or a filled half and half, light cream and heavy cream froth.

Formulations of "non-saturated-fat heavy cream" can be whipped into a novel "non-saturated-fat whipped cream." This novel "non-saturated-fat whipped cream" differs from conventional whipped cream in that, when frozen, advantageously, it does not freeze with the rigidity of conventional whipped cream and can be hand scooped out of a frozen container and partaken as a novel "non-saturated-fat ice cream." One may chose to homogenize a liquid vegetable fat (e.g. soy oil) into evaporated milk (i.e. saturated fat) so that, when flavored (e.g. strawberry, vanilla, or chocolate, and sweetener) and frozen, it is similar to ice cream. This novel "mixed fat ice cream" can be as smooth as is conventional ice cream.

(3) Saturated and non-saturated fat can be homogenized into various combinations of products. For example, one may choose to homogenize a saturated and/or a non-saturated fat into a liquid milk and/or a liquid-plus-egg product. One may choose to homogenize a saturated and/or a non-saturated fat into a powdered milk and/or a powdered egg and a liquid mixture. Or, powdered milk and/or powdered egg can be the employed to enriched a liquid milk and/or an egg mixture.

(4) Non-saturated fat can be homogenized into cold milk. Saturated fat requires that the milk be hot enough to melt the saturated fat.

(5) A liquid is mixed with egg products so that they will not be too viscous to pass through the homogenization screen. For safety, raw egg mixed with a liquid (for example, water, milk and/or an alcoholic beverage) is initially heated to pasteurize the egg.

If heavy cream is whipped too long, the whipped cream turns into butter and a liquid. The present hand operated kitchen appliance can be employed to homogenize liquid butter fat, back into said liquid and so reconstitute the heavy cream. In operation, a mixture of said liquid and butter is heated until the butter melts, it is homogenized as taught herein, and the renewed cream is chilled.

The present hand operated kitchen appliance can be employed to homogenized saturated and non-saturated fat into egg and water, egg and alcohol (for example, wine) and egg and milk mixtures. These resulting saturated and non-saturated fat egg-plus-liquid mixtures can be whipped into an expanded foam similar to a meringue or whipped cream. One representative operation may include:

(a) To one whole shelled egg (two liquid ounces), add four ounces of water or milk, add two ounces of liquid fat (for example corn oil), then mix, beat or blend. Next, heat mixture in a microwave oven (use a thermometer) until the mixture reaches circa 165° F. (to pasteurize the egg in the mixture). Immediately, before the egg can cook (fully denature), remove from microwave oven insert and operate plunger, homogenizer frother therein. Plunger, homogenizer frother reciprocated at a slow speed simply homogenizes. Plunger, homogenizer frother reciprocated, at a faster speed, both homogenizes and froths the resulting beverage. Some may prefer to heat the egg mixture to a higher temperature and/or wait before homogenizing so that some solid cooked egg is present.

(e) The Kitchen Appliance Employed as an Improved Coffee Brewer.

The "reciprocating plunger" of the prior-art, hand-operated, milk-frothing apparatus, for example, the apparatus taught in U.S. Pat. Nos. 5,580,169 and 5,780,087, cannot be used as the plunger for the French Press apparatus as its small frothing "sieve" like holes quickly fill with coffee grounds or tea leaves and coffee grounds and tea leaves pass around the circumference of the frothing plunger and in either case render the apparatus inoperable. Here, the plunger taught in U.S. Pat. No. 5,635,233, "Methods for Preparing a Coffee, Tea or Milk Beverage," is redesigned (1) to froth milk, (2) to homogenize liquid fat into milk and eggs and (3) to replace the plunger-strainer of a conventional French Press coffee apparatus.

FIG. 1 illustrates a side-view cross-section composite view of this multiple utility kitchen appliance. For members of a family, who desire black coffee, plunger, homogenizer frother 6 can function as does a prior art, French Press spring plunger.

I have discovered that the well known nylon-mesh Lycra® foot sock type fabrication makes an efficient, semi-disposable, easily employed and cleaned filter cover for both the instant hand operated coffee maker and for my motor operated coffee maker, U.S. Pat. No. 5,800,852, "A Coffee/Tea, Table Blender and Microwave Oven Apparatus and Methods for Its Use." The instant kitchen appliance is provided with at least one nylon-mesh Lycrao® filter cover 9 for container 1.

The well known nylon or nylon and cotton mesh, Lycra® foot sock fabrication makes an efficient, easily employed and cleaned, filter cover 9 and 22. The Lycra band 20 secures the nylon mesh 22 under upper lip 11 of brewing container 1. Nylon fabrications are reusable. Common nylon foot socks are inexpensive and may be disposed of after each use as one disposes of paper coffee filters.

Figures 7, 8:
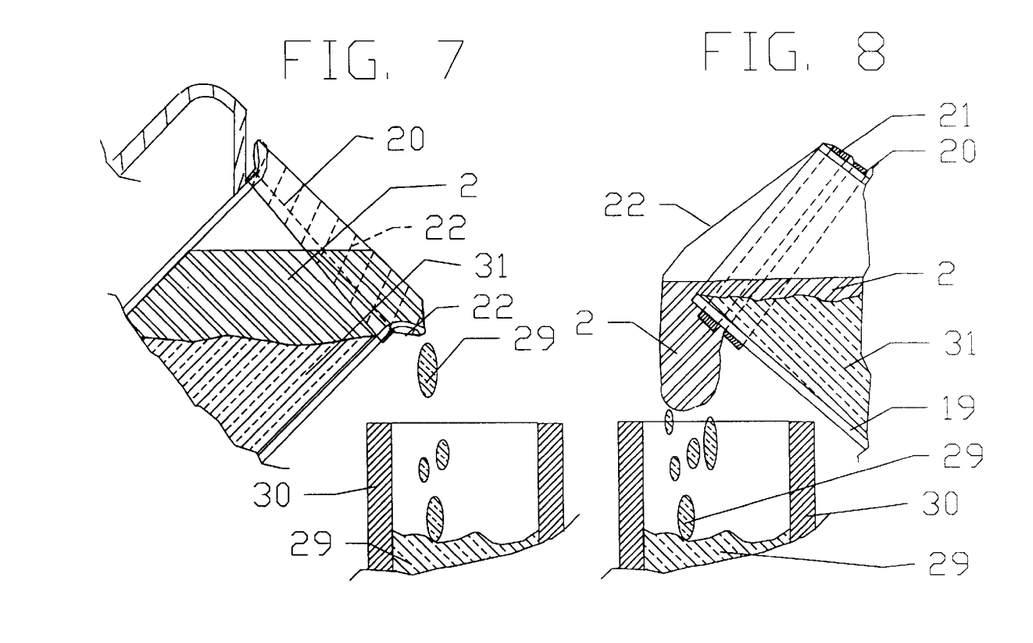
FIG. 7 is a cut away view that illustrates how the a nylon-mesh Lycra® filter cover attaches to a container that has a lip to secure the Lycra® band thereunder and how coffee grounds are filtered out of the brewing coffee through nylon mesh filter.
FIG. 8 is a cut away view that illustrates how the a nylon-mesh Lycra® filter cover attaches to a container that lacks a lip to secure the Lycra® band thereunder and how coffee grounds are filtered out of the brewing coffee through nylon mesh filter.

In FIG. 8, for brewing containers that do not have an upper lip to secure the Lycra® band 20 thereunder, for example, a coffee cup or a drinking glass, I have discovered that, if a plastic "rubber band" 21 is placed around the upper rim of brewing container 19, rubber band 21 acts as does upper lip 11 to secure the Lycra® band 20 there below.

Rubber band 21 simplifies the securing to and the removal of the Lycra® band from the many household beverage container that do not have an upper lip 11. Rubber band 21 prevents the Lycra® band 20 from slipping off container 19 when it is subject to the weight of filtered coffee ground 2 and coffee 29. In FIG. 8, the nylon-mesh Lycra® filter cover 9 illustrated is larger than is necessary so that when the coffee and coffee grounds are filtered there through, the large size permits filtering to take place in a pouch outside of container 1. Some may prefer this large size mesh as it creates a large surface area to speed filtering. Some may prefer this oversized mesh because the spent coffee grounds remain in the pouch for easy disposal. In contrast, as illustrated in FIG. 7, some may prefer a tightly fitting nylon mesh that confines the spent coffee grounds to the interior of container 1.

The nylon-mesh pouch outside of container 1, illustrated in FIG. 8, is useful when the liquid to be filtered is viscous. To speed up filtering, table tongs (not shown) or the like can be employed to mechanically squeeze the pouch to force the viscous liquid through the nylon mesh.

Figure 6:
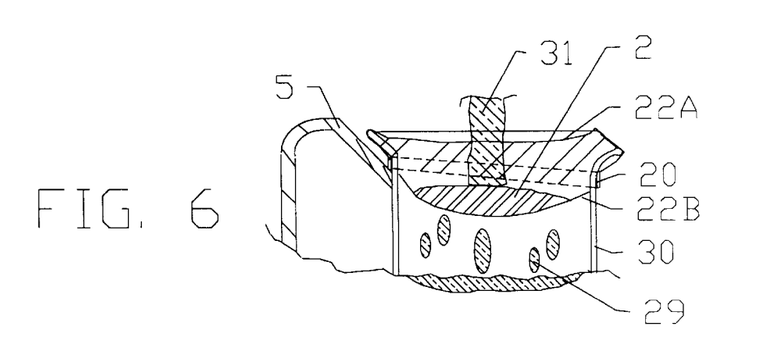

Alternately, as illustrated in FIG. 6, some may prefer to place filter cover 9 on a receiving container 30 and the brewing coffee poured and filtered into the receiving container 30.

In one embodiment, FIG. 7, liquid and coffee grounds 2 are placed in container 1 and covered by nylon-mesh Lycra® filter cover 9. Water and milk are added and the brewing initiated by swirling coffee grounds 2 and liquid in container 1. Then, the brewing coffee grounds immersed in water and/or milk in container I are heated in a microwave oven. The brewing coffee is removed from the microwave oven and again agitated by swirling. The brewing coffee may be allowed to further brew for a predetermined time. Thereafter, the brew 29 is poured and filtered out of the container I through nylon mesh filter cover 9.

Nylon-mesh, Lycra® filter cover 9 is removed from container 1 emptied and rinsed. In a well known manner, one inserts one's hand into nylon mesh filter cover 9 and spreads open one's fingers thereby spreading open the nylon mesh. Whereupon, under running water one easily rinses out any remaining coffee grounds.

In contrast, to the ease in cleaning nylon mesh filter cover 9, open pore polyurethane filter 7 and open-pore polyurethane filter are harder to clean for they can catch and hold small coffee grounds. To clean the open pore polyurethane filter, the plunger, homogenizer frother 6 assembly is taken apart and the open pore polyurethane filter is removed. Polyurethane filter can be cleaned in a number of ways. One way to clean filters 6 and 7 is to place the polyurethane filter in the sink under a running faucet and while water is poured over it, brush it clean with a kitchen sink brush. Brushing spreads the pores and releases trapped coffee ground. In contrast, some may dispose of nylon mesh filter cover 9 or the polyurethane filter after each use in the same manner as one disposes of used paper coffee filters.

Nylon-mesh Lycra® filter cover 9 is useful in my copending U.S. Pat. No. 5,800,852, "A Coffee/Tea, Table Blender and Microwave Oven Apparatus and Methods for Its Use," that claims a filter cover secured to the top the blender jar.

It is believed that nylon mesh filter cover 9 provides a speedier filtering and an ease of use and cleanup than does either open pore polyurethane filter, prior art coffee paper filters or the prior art stainless-steel French-Press plunger strainer. It should be appreciated that while a nylon and Lycra® filter is preferred, other combinations of nylon and cotton mesh and the like, and other elastic plastic mesh are useful. It should be appreciated that the prior art stainless-steel mesh filter member can be replaced with a nylon mesh fabric. After the stainless steel mesh filter is removed, the nylon mesh is wrapped around the remaining, stainless-steel plunger-spring combination and removably secured to the plunger rod. (not shown)

Some may prefer to brew and filter an individual portion of coffee, in one container of a multiple container kitchen appliance, while concurrently preparing a saturated or non-saturated-fat milk foam in a second container of the kitchen appliance. Thereafter, the foam is poured onto the coffee covering the coffee. The resulting "cappuccino" type coffee differs from conventional cappuccino coffee produced by a conventional expresso, milk-frother machine. Conventional expresso, milk-frother machines are limited to 1% milk froths because milk with more than 1% fat clogs the frothing nozzle. In contrast, the "cappuccino" froths prepared, as taught herein, may have 30% saturated and/or non-saturated fat content.

The containers of this invention may be fabricated of metal and heated on a conventional gas and electric burner or fabricated of a microwave transparent material and heated in a microwave oven. Container 1, fabricated from heat resistant glass, is useful in both conventional and microwave heating.

In the same manner as illustrated in the prior art French Press Coffee apparatus, in FIG. 1, a guide hole 26 can be fabricated into accessory cover 4 and used to guide rod 8 parallel to the vertical walls of container 1.

In operation, to prepare a Cappuccino type coffee beverage, in FIG. 2, after the coffee ground 2 and water 3 are heated and the coffee brewed, filter 7 is placed onto or inserted into the top of container 1. Thereafter, in FIG. 3, plunger, homogenizer frother 6 forces filter 7 to the bottom of container 1 thereby securing between the bottom of filter 7 and the bottom 10 of container 1 filtered out coffee grounds 2. Next, in FIG. 4, plunger, homogenizer frother 6 is disengaged from filter 7. A milk or egg product is added to the filtered coffee 25 and, in FIG. 4, plunger, homogenizer frother 6 is reinserted into container 1 and rapidly agitated in an up and down direction 12 creating a froth 14 on top of filtered coffee 25. In FIG. 5, when froth 14 reaches a predetermined amount, plunger, homogenizer frother 6 is removed from container 1. Thereafter the beverage can be consumed directly from container 1 or poured into a cup, not shown, served and consumed. The methods taught in my copending U.S. Pat. No. 5,925,394 for "Methods for Denaturing and Whipping into a Foam Certain Denaturable Proteins Found in Milk Products and Egg Products and the Resulting Product," are useful herein. Care must be taken to insure that the milk or egg product is not fully denatured before trying to create a lasting froth. If the added milk or egg is fully denatured, it will not create a useful froth.

A cook can use plunger, homogenizer frother 6 to produce the longer lasting expanded froths taught in my copending U.S. Pat. No. 5,925,394. Or, the same cook can use plunger, homogenizer frother 6 to produce the cool temporary milk froths taught in U.S. Pat. Nos. 5,580,169 and 5,780,087.

If milk is heated in container 1 directly on a conventional gas or electric burner, it coagulates (e.g. fully denatures) and burns where it contacts the directly heated inner, bottom wall of container 1. To obviate this undesirably coagulation and burning, when heating the brewing coffee directly on a conventional gas or electric burner, in FIG. 1, milk (or an egg and water mixture) 14 is placed in footed container 15 and is heated by the brewing coffee, in the manner of a double boiler. The brewing coffee is simmered (210° F.) until the milk reaches the circa 180° F. denaturing temperature of milk (or the circa 165° F. pasteurizing and denaturing temperature of egg), container 1 is removed from the conventional gas or electric burner. Handle 27 is used to lift the heated milk 14 from container 1. The brewed coffee is filtered and poured into a second container. The hot milk 14 is poured out of container 15, (not shown) to mix with the hot filtered brewed coffee. The greater mass of the circa 210° F. coffee brew raises the milk 14's circa 180° F. temperature to the milk's circa 200° F. denaturing temperature and the mixture is immediately frothed with plunger, homogenizer frother 6 to create a cup of coffee with long lasting froth.

Because microwave energy does not heat container 1, per se, when container 1 is heated in a microwave oven, milk 14 may be initially added to the heated, brewing mixture. Microwave energy does not coagulate and burn milk 14 touching container 1's cool inner walls. For those that employ a built in microwave oven thermometer, it is preferred to heat milk 14 in container 30, concurrent with the brewing of the coffee in container 1. It is preferred to heat the brewing coffee until it simmers. Filter 7 is inserted into container 1. Plunger, homogenizer frother 6 is employed to drive filter 7 to the bottom of container 1 filtering coffee 25 and then, before the milk can fully denature, plunger, homogenizer frother 6 is employed to froth the mixture. Accessory cover 4 is useful during frothing to keep, when the plunger is raised, the generating froth within container. More than one container is in contemplation. More than one plunger, for example, a dedicated strainer plunger, per se, a dedicated homogenizer plunger, and a dedicated frothing plunger, per se, or two or more homogenizer frother strainers, can be part of the kitchen appliance. More than one nylon-mesh Lycra® filter cover and nylon-mesh Lycra® filter covers of different gauge, dimension and elasticity can be part of the kitchen appliance.

Hole 9 or a second hole, not shown, may hold a thermometer, not shown, to monitor the temperature of a brewing coffee, tea, or milk beverage. Cover 4 is useful when container 1 is used to prepare, serve hot and store coffee, tea, and herbal tea. Preferably, cover 4 is transparent to monitor the operation especially when container I is metal.

Clean up of homogenizer frother 6 and filter 7 is simple. Container 1 is partially filled with soapy water. The sudsy water, with filter 7 therein, is frothed by homogenizer frother strainer 6. Container 1 is emptied and the cleaning cycle is repeated followed by similar rinse cycles. Stainless steel mesh filters are easily cleaned. The polyurethane filter and the polyurethane frother disks are reusable. They are inexpensive to replace.

(f) The Kitchen Appliance Employed to Brew Fat Enriched Wheat, Rice and Soy Beverages.

In operation, to produce an enriched bean or seed beverage from its milled state one adds one coffee measure of, for example, a commercial soy, rice and/or wheat flour, to a cup of water in container 1. Mix the mixture by hand or with an electric mixer. Add, for example, one ounce of a liquid fat and heat the mixture in a microwave oven until it almost boils out of container 1. Beans or rice take circa twenty minutes to cook conventionally. In contrast, milled particles of beans or rice cook in a few minutes. The cooked mixture is removed from the microwave oven and plunger, homogenizer frother 6 is inserted into container 1 and operated and removed. A thin brew is an enriched "soy milk," "rice milk" and/or "wheat flour milk" beverage. A thick brew has the appearance and utility of cream.

Comments:

1. There is no need to filter the resulting homogenized enriched "soy milk," "rice milk" and/or "wheat flour milk."

2. Without adding any liquid fat and without filtering, the cooked milled soy or rice beverage is simply a home made soy milk or rice milk.

3. Adding too much soy, rice or wheat flour results in a paste or cereal.

4. The kitchen appliance is useful for those that do not have a table blender so cannot practice the teachings of my U.S. Pat. No. 5,800,852, "A Coffee/Tea, Table Blender and Microwave Oven Apparatus and Methods for Its Use."

(g) The Kitchen Appliance Employed to "Microwave-Roast" Beans and Seeds for Consumption as Snacks and as Enriched Beverages.

In operation, to produce microwave-roasted beans (for example, green coffee beans and soy beans) and seeds (for example rice) add one serving of the beans and/or seeds to container 1. Add enough saturated or unsaturated fat to container 1 so that when heated the beans or seeds will be immersed in liquid fat. Place container 1 into a microwave oven and expose the mixture to microwave energy. First the mixture rises to the boiling point of water and holds at that temperature until the "dry" beans and/or seed fully dry. Thereafter, the temperature of the mixture rapidly rises until it reaches and is held at a circa 400° F. browning temperature. The browning mixture is visually monitor until the microwave-roasting beans or seeds reach a desired color. The microwave-roasted beans and/or seeds are removed from the microwave oven. Since the beans and/or seeds self heat when exposed to microwave energy, they start to cool the moment the microwave energy is turned off. The microwave-roasted soy beans and microwave-roasted rice, still covered with oil or with the heating oil removed, may be partaken cool as a (cooked) snack food or may be ground and further processed as in "(f) THE KITCHEN APPLIANCE EMPLOYED TO BREW ENRICHED WHEAT, RICE AND SOY BEVERAGES," supra.

Comments on microwave-roasting:

1. The microwave-roasted soy beans and the microwave-roasted rice are small and fragile and can be partaken as a snack food. They can be added as one might add poppy and caraway seeds to a foodstuff.

2. A few of the microwave-roasted rice grains pop as does popcorn. These popped rice grains do not detract from the resulting snack or beverage.

3. If coffee beans are microwave-roasted until they are soft enough they may be partaken as a snack food.

4. Large microwave-roasted seeds as microwave-roasted chick peas are ground before, as taught supra, they are turned into a beverage. Large microwave roasted chick peas are too rigid to use as a snack food.

5. When used as a snack food the microwave-roasted beans and grains may be blotted to remove excess oil.

6. When used as a beverage, the microwave-roasting oil is left in place and a predetermined additional amount of oil added to the microwave-roasted beans or grains prior pulverizing them and turning them into the homogenized beverage described supra.

7. Because the grains and beans "microwave-roast" in oil at circa 400° F., in microwave-roasting, the overpowering, objectionable odor, released by a conventional roaster, is not present.

8. Advantageously, to suit the varied tastes of individual members of a family, individual portions of green coffee beans can be microwave-roasted, at home, to suit individual preferences as to roasted color and/or flavor.

9. The ability to homogenize, as taught supra, an individually selected amount of liquid fat into ones coffee, tea, soy, or rice obviates the need to keep on hand half and half, light, medium and/or heavy cream.

10. Microwave-roasting beans and grains can be used to prepare "roasted soy milk," or "roasted rice milk" in a table blender by following the teachings of my U.S. Pat. No. 5,800,852, "A Coffee/Tea, Table Blender and Microwave Oven Apparatus and Methods for Its Use."

Although this invention has been described with a certain degree of particularity, it is understood that the present disclosure has been made by way of example and that numerous changes in methods, details of construction and arrangement of parts may be resorted to without departing from the spirit and scope of the invention.

I claim:

1. A method for using a French Press coffee maker that includes the steps of:

placing, into the container of said French Press coffee maker, a preselected amount of foodstuff wherein said foodstuff is selected from a group consisting of a mammal foodstuff, a liquid-plus-bird foodstuff and combinations of said foodstuffs wherein said mammal foodstuff is selected from a group consisting of skim milk, whole milk, light cream, evaporated milk, and reconstituted powdered milk and wherein said liquid-plus-bird foodstuff is selected from the group consisting of whole egg, egg yolk, powdered whole eggs and powdered egg yolk, adding in a preselected amount of a liquid fat, reciprocating said French Press coffee maker's strainer member in said liquid fat and said foodstuff, thereby homogenizing said liquid fat and said foodstuff by forcing said liquid fat through small openings in said French Press coffee maker's strainer member.

2. A method for preparing a beverage that includes the steps of:

selecting a container, placing into said container a foodstuff wherein said foodstuff is selected from the group consisting of bean foodstuff and seed foodstuff and combinations of said foodstuffs, wherein said bean foodstuff is selected from the group consisting of soy beans, coffee beans, and chick peas and wherein said seed foodstuff is selected from the group consisting of rice, corn and wheat, adding a liquid, cooking, while immersed in said liquid, said foodstuff, adding a liquid fat, and thereafter, within said container, reciprocating a homogenizer member that homogenizes said liquid fat into said foodstuff when said liquid fat passes through said homogenizer member.

3. A method for preparing a beverage, according to claim 2, that includes:

where said foodstuff is milled prior to being cooked.

4. A method for preparing a beverage, according to claim 2, that includes the steps of:

after adding said fat and before said adding a liquid and before said cooking, microwave-roasting said foodstuff by exposing said foodstuff, immersed in said liquid fat, to microwave energy, and then grinding said microwave-roasted foodstuff.

5. A method of homogenizing a liquid fat into a foodstuff wherein said foodstuff is selected from the group that consists of a liquid milk product and a liquid-plus-egg product and a combination of said products that includes the steps of:

placing said liquid fat and said foodstuff in a container where said container is cylindrical with a closed bottom and an open top, placing a plunger member and a homogenizer member fabricated to homogenize liquid fat into said foodstuff when said plunger member reciprocates said homogenizer member in said container, where said homogenizer member has a larger circumference than said top opening of said container and is porous, elastic and bends and compresses against the walls of said container when inserted in said container, and moves easily on the walls of said container, and reciprocating said plunger member and homogenizer member in said container.

6. A method of homogenizing a liquid fat into a foodstuff, according to claim 5, that includes the step of:

where said fat is solid at room temperature, heating said solid fat until it melts.

7. In a method for using a French Press coffee maker where the improvement comprises:

homogenizing a non-saturated-fat into a foodstuff wherein said foodstuff is selected from the group that consists of a non-fat milk, liquid-plus-egg white, and combination of said until said foodstuff has the fat content of cream, by placing a mixture of a predetermined amount of non-saturated fat and a predetermined amount of said foodstuff into the French Press container, and reciprocating the French Press plunger member until said non-saturated fat homogenizes into said foodstuff.

8. In a method for using a French Press coffee maker, according to claim 7, that includes the step of:

freezing said non-saturated-fat, homogenized foodstuff and subsequently partaking of said frozen, homogenized foodstuff.

9. In a method for using a French Press coffee maker where the improvement comprises the steps of:

heating coffee grounds and a liquid in said French Press coffee maker's container, waiting a predetermined time until the coffee is brewed, inserting a coffee filter into the top of said French Press coffee maker's container, inserting the plunger, strainer member of said French Press coffee maker into said container on top of said filter and pushing said filter to the bottom of said container thereby securing between the bottom of said filter and the bottom of said container filtered out coffee grounds, adding a predetermined amount of oil adding a predetermined amount of milk, rapidly agitating, in an up and down direction, said plunger, strainer member both to create a froth on said filtered brewed coffee and to homogenize said oil, milk and filtered coffee, and removing said plunger, strainer member from said container.

10. In a method for using a French Press coffee maker, according to claim 9, where said milk is egg.

11. A method of brewing a beverage from a foodstuff wherein said foodstuff is selected from the group consisting of coffee grounds, tea leaves, ground soybeans, ground rice seeds, and combinations of said coffee grounds, tea leaves, ground soybeans, ground rice seeds that includes the steps of:

placing a liquid and, at least one, of said foodstuff in a container that has an open top, adding a plastic mesh filter cover and an elastic means to secure said mesh filter to said open top of said container, heating said foodstuff in said liquid in said container, and then pouring said hot beverage out of said container through said filter cover.

12. A method of brewing a beverage, according to claim 11, that includes:

where said mesh filter is nylon.

13. A method of brewing a beverage, according to claim 11, that includes the step of:

where said open top of said container does not have an upper lip to secure said elastic means there under, placing an elastic band around the upper rim of said container to act as an upper lip to secure said elastic means.

14. A method of brewing a beverage, according to claim 11, that includes the step of:

where said mesh filter cover is fabricated so that when said hot, beverage is poured out of said container through said filter cover said mesh filter cover forms a pouch that contains said filtered out foodstuff external said container.

15. A method for microwave-roasting a foodstuff wherein said foodstuff is selected from a group consisting of green coffee beans, dried soy beans, rice grains and combinations of said green coffee beans, dried soybeans, rice grains that includes the steps of:

placing, at least one, of said foodstuff in a container, adding a liquid fat to immerse said foodstuff in said liquid fat in said container, microwave-roasting said foodstuff by exposing said foodstuff, immersed in said liquid fat, to microwave energy, until said foodstuff heats to, at least, 400° F. and browns to a preselected color.

16. In the method of claim 15, the added steps of:

grinding the microwave roasted foodstuff, brewing the ground microwave roasted foodstuff in a liquid, and filtering the resulting brew.

17. In the method of claim 16, the added step of:

homogenizing said liquid fat in said brew.

* * * * *